United States Patent [19]

Wilson et al.

[11] Patent Number: 4,693,278

[45] Date of Patent: Sep. 15, 1987

[54] SAFETY CLOSURE MEMBER

[75] Inventors: Buddy A. Wilson, Sapulpa; Coy D. Osborn, Tulsa, both of Okla.

[73] Assignee: T. D. Williamson, Inc., Tulsa, Okla.

[21] Appl. No.: 928,833

[22] Filed: Nov. 10, 1986

[51] Int. Cl.[4] ............................................. F16L 55/10
[52] U.S. Cl. ........................................ 138/89; 138/94;
220/203; 220/315; 220/323
[58] Field of Search ................. 138/89, 94, 94.3, 94.5;
137/315, 318; 220/203, 238, 323, 306, 307, 367,
378, 293, 206, 315, 327, 281, 284, 303, 316;
251/322, 354

[56] References Cited

U.S. PATENT DOCUMENTS

| | | | |
|---|---|---|---|
| 3,766,947 | 10/1973 | Osburn | 138/89 |
| 4,019,541 | 4/1977 | Koppl | 138/89 |
| 4,371,005 | 2/1983 | Morrill et al. | 138/89 |
| 4,387,740 | 6/1983 | Vanzant | 138/89 |
| 4,466,550 | 8/1984 | Sullivan | 220/203 X |

Primary Examiner—James E. Bryant, III
Attorney, Agent, or Firm—Head Johnson Stevenson

[57] ABSTRACT

A safety closure for use in a flange in which the flange has an internal circumferential groove in the passageway therethrough, the closure being formed of a cylindrical body slidably receivable within the flange passageway, the body having a reduced diameter opening therethrough, a plurality of leaves slideably supported to the body, the outer ends of the leaf being receivable in the flange groove, an elastomeric gasket to seal the periphery of the body to the flange passageway, and a pressure relief member slidably received in the body passageway, the upper end of the pressure relief member being of enlarged diameter and received between opposed inner ends of the leaves when the leaves are outwardly positioned within the flange groove to thereby prevent the leaves from being removed from the groove, the pressure relief member being downwardly displaceable to an open position permitting fluid flow through the cylindrical body prior to permitting the leaf to be retracted thereby assuring release of pressure before the leaves can be moved to the position permitting the closure member to be removed from the interior of the flange.

9 Claims, 11 Drawing Figures

SAFETY CLOSURE MEMBER

SUMMARY OF THE INVENTION

The use of a flange to close piping connected to high internal pressure is well known. Further, the concept of a removeable plug to close the interior of a flange is also a common expedient. For reference to prior art relating to this subject, the following U.S. patents are applicable: U.S. Pat. Nos. 278,670, 822,562, 3,070,129, 3,125,123, 3,155,116, 3,449,860, 4,178,967, 4,188,675, 4,360,290, 4,387,740 and 4,466,550.

The most relevant known prior art to the present invention are five patents assigned to T. D. Williamson, Inc. of Tulsa, Oklahoma as follows: VerNooy U.S. Pat. No. 3,155,116, Osburn U.S. Pat. No. 3,766,947; Rankin U.S. Pat. No. 4,058,142; VanZamt U.S. Pat. No. 4,387,740; and Sullivan U.S. Pat. No. 4,466,550. Each of these prior issued patents disclose closure members which are adaptable to close the passageway through a flange and including means for removing the closure when necessary. The present invention relates to an improvement in the basic concept disclosed in these prior art patents and particularly relates to improved safety features. One of the safety problems concerned with the use of closure members in flanges is that it is very hazardous to release a closure member from confinement within the interior of a flange when the closure member is under pressure. When such occurs, the closure member can be forced out of the flange at great speed and can cause injury to the operators and damage to equipment used for removing the closure member. Another problem is that it is extremely important for the operator to know that the closure member is in securely locked position before pressure is permitted to accumulate below the closure member.

The present invention provides a closure member for flanges which has several advantages including the following (1) The flange itself includes no moving parts, that is all the moving parts are confined within the closure member. (2) The possibility of leakage of the flange is prevented since no holes, O-rings, hardware and so forth are required on the outside of the flange. (3) The closure member includes a relief mechanism which keeps the closure member locked (that is, prevents it from being unlocked) without the bypass opening through the closure member being first opened. (4) The action of opening or closing the pressure relief of the closure member is distinct and separate from the action of locking or unlocking the closure member. (5) The closure member of this invention is adaptable to a variety of alternate flange designs.

The closure member is formed of a cylindrical body of external diameter which can be slidably received within the passageway through a flange. The flange must be of the type having an internal circumferential groove and preferably also has an internal circumferential ledge below the groove. The closure member cylindrical body has a reduced diameter passageway through it.

A plurality of leaves are slidably supported to the cylindrical body. Each leaf has an outer end and an inner end and each leaf is slidable between an outward and inward position. The outer ends of the leaves are receivable in the flange groove when the leaves are slidably utwardly extended to thereby retain the cylindrical body in the flange passageway.

The cylindrical body has a circumferential groove on it below the leaves and an elastomeric gasket is received in the groove and provides means to seal the passageway when the cylindrical body is in position in the flange.

A pressure relief member is slidably received in the cylindrical body passageway. The pressure relief member has an internal opening through it and has an enlarged diameter upper end and an enlarged diameter lower end. The pressure relief member is upwardly biased by a spring. The enlarged diameter upper end is receivable between opposed inner ends of the leaves when the leaves are in their outward positions, but the pressure relief member is prevented from moving upwardly when the leaves are in the inward positions because of the overlap of the inner ends of the leaves. A seal is provided in the relief member so that when it is in the upward position flow of fluid through the reduced diameter opening is prevented.

To install the closure member it is positioned within a flange. The leaves are utwardly extended so that the outer ends extend within the interior circumferential groove within the flange. This permits the relief member to be moved upwardly by spring compressive force to seal the passageway through the cylindrical member. This upward movement of the relief member also prohibits the leaves from being internally retracted, thus, preventing the inadvertent removal of the closure member. To remove the closure member, the relief member must be first downwardly depressed, providing fluid flow through the relief member to thereby relieve pressure fromthe interior of the closure member and to equalize pressure across the closure member. Thereafter, the leaves may be withdrawn, permitting the closure member to be removed from within the flange.

A better understanding of the invention will be had by reference to the following description and claims taken in conjunction with the attached drawings:

DESCRIPTION OF THE PREFERRED EMBODIMENT

Figure 1:
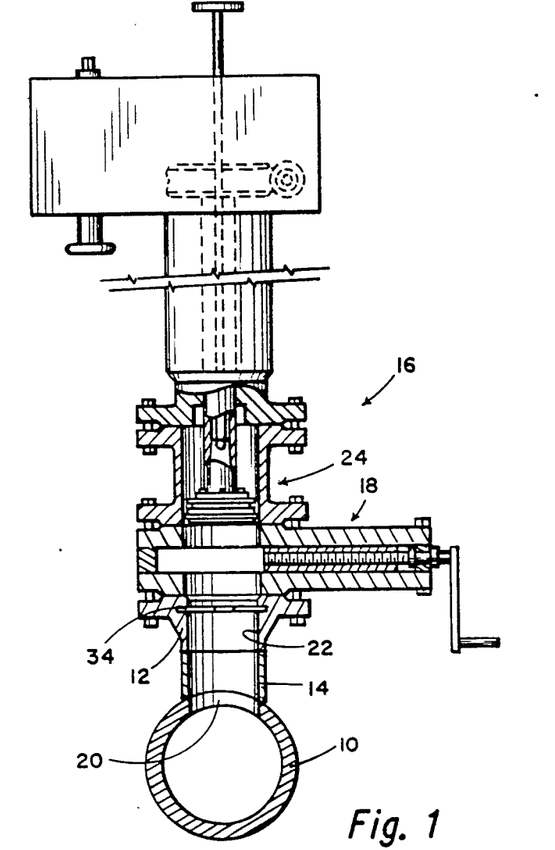
FIG. 1 is an elevational view, shown partially in cross-section, of a pipeline having a flange thereon communicating with the interior of the pipeline and showing a mechanism used for installing and removing a closure member from within the interior of the flange so that the flange can be closed off or opened as necessary.

Referring to the drawings and first to FIG. 1 a pipeline is shown in cross-sectional view and identified by the numeral 10. A flange 12 is attached to pipeline 10 by a short tubular member 14. While the invention may be used in a variety of ways a typical application is one in which, after the pipeline 10 is in use, it is determined that an opening needs to be provided in the pipeline and the opening must be provided without taking the pipeline out of service, that is without depressurizing or draining the pipeline. To accomplish this the tubular member 14 is welded to the exterior of the pipeline and flange 12 welded to it. A tapping machine, generally indicated by the numeral 16, is affixed to the flange. The tapping machine includes a valve generally indicated by the numeral 18. By a mechanism not shown the tapping machine can extend a cutter through flange 12 and tubular member 14 to cut a hole 20 in the wall of the pipeline 10. Thereafter the cuttingtool may b withdrawn and a pipe or other apparatus communicating with the interior of the pipeline 10 may be attached, the valve 18 being opened and closed as necessary during the procedure to prevent the interior of the pipeline from being exposed to the environment and thereby prevent leakage of fluid or gases from the pipeline. This procedure is a well known technique employed in the industry. After communication is established with the pipeline, such as, for instance, to by-pass a portion of the pipeline, such as, for instance, to by-pass a portion of the pipeline, it is desirable to close off the passageway 22 extending through the flange 12 with a closure member, after which the tapping machine 16, including the valve portion 18, may be removed. Such closure member needs to be removeable so that if desired in the future, access can again be reestablished with the interior of pipeline 10. It is an improved closure member to which the present invention is applied. FIG. 1 shows a closure member generally indicated by the numeral 24 as in position for being inserted outwardly through the valve 18 into the interior of flange 12.

Referring to FIGS. 2 through 7, a preferred embodiment of the improved closure member of the present invention is shown.

The closure member is formed of a cylindrical body 26 having an external cylindrical surface 28 of diameter to be slidably received within the flange. The configuration of the cylindrical surface 28 preferably includes an enlarged diameter lip portion 30 which sits on a ledge 32 formed in the interior of the flange passageway 22. By the provision of lip 30 and ledge 32, when the closure member is inserted into the flange, it is automatically properly positioned relative to the flange.

Figure 5:
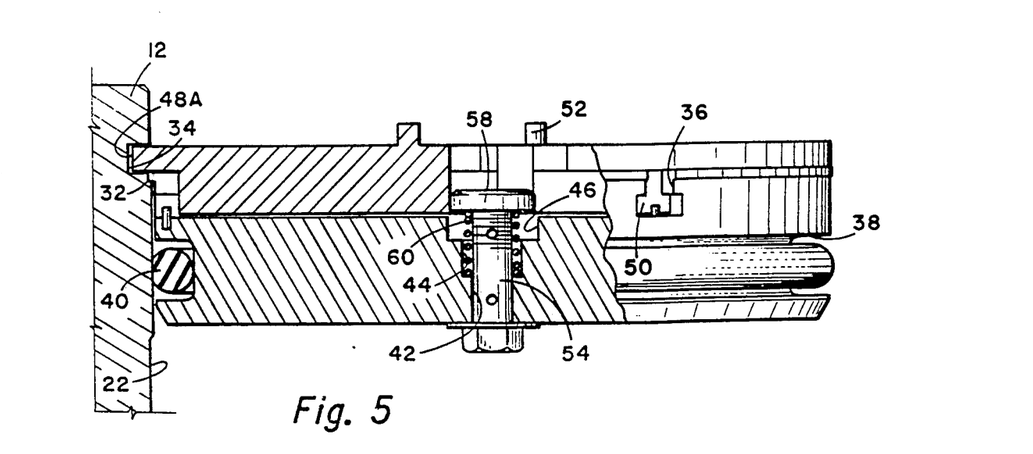
FIG. 5 is a cross-sectional view taken along the line 5—5 of FIG. 4.

Flange 12 includes an internal circumferential groove 34 positioned above the ledge 32.

Figure 2:
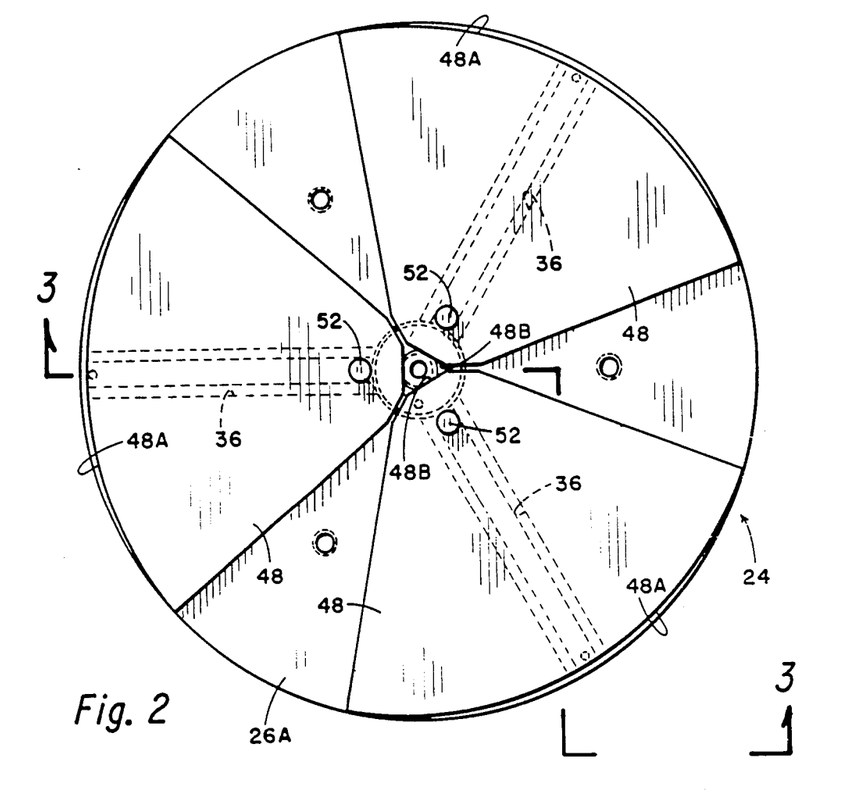
FIG. 2 is a top plan view of the closure member as employed in practicing the invention.
Figure 3:
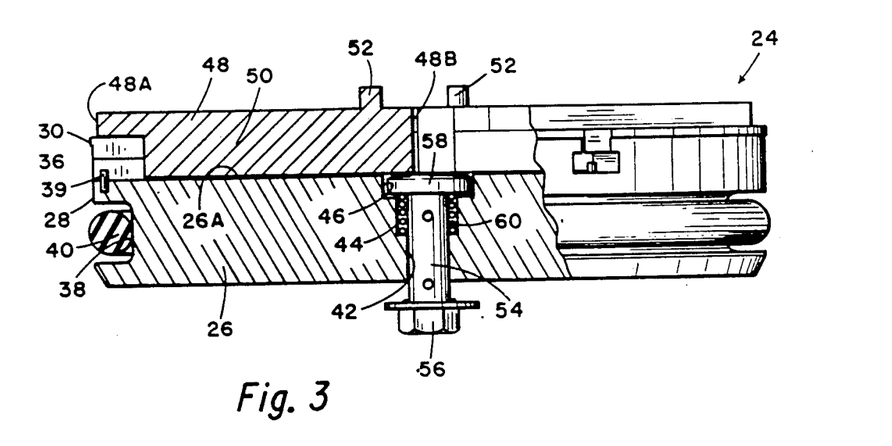
FIG. 3 is an elevational view shown partially in cross-section as taken along the line 3—3 of FIG. 2.
Figure 4:
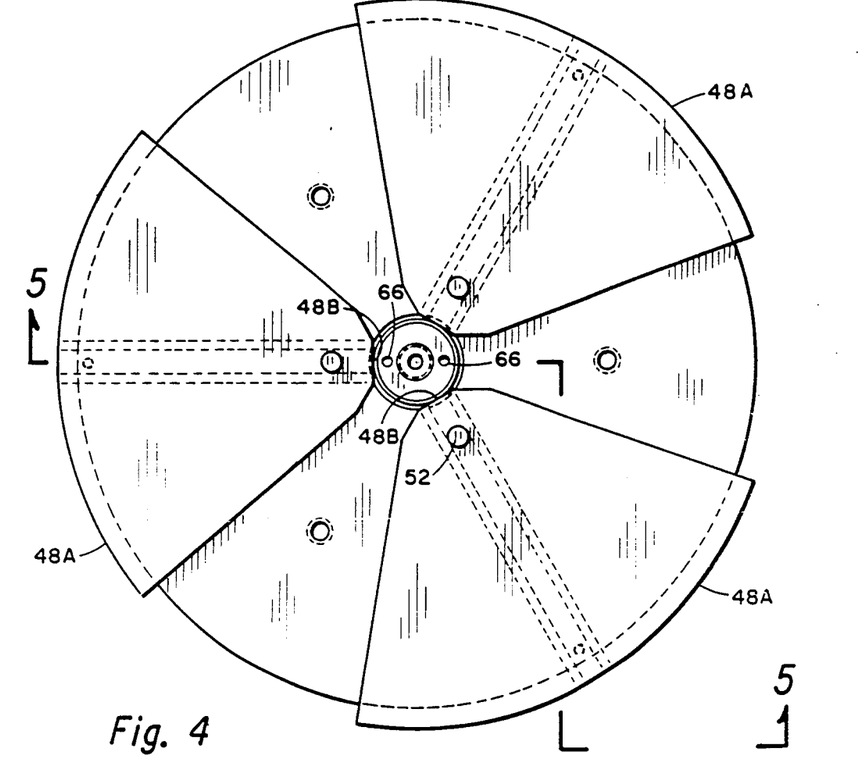
FIG. 4 is a top view of a closure member as in FIG. 3 but showing the leaves of the closure member outwardly extended as in the position wherein the closure member is locked withint the interior of the flange and the pressure relief is in the closed position.

The cylindrical body 26 has a plurality (three are shown in the illustrated embodiment) of radially extending T-shaped grooves 36. The cylindrical body 26 is further defined by a circumferential groove 38 which receives an elastomeric seal 40. When the closure member 24 is positioned within flange 12 the seal 40 compresses against the interior sidewall of passageway 22, thereby closing the passageway.

Formed within the cylindrical body 26 is a reduced diameter pressure relief passageway 42 which preferably includes an internal ledge 44 and an increased internal diameter upper portion 46.

Affixed to the top surface 26A of the cylindrical body are a plurality (three being shown in the illustrated embodiment) of leaves 48. Each of the leaves has an outer end 48A and an inner end 48B. Each leaf has, extending integrally from its underneath surface, a T-shaped portion 50 which is slidably received in one of the T-shaped grooves 36. Thus, the leaves 48 are reciprocally extendable in a radial direction relative to the closure member.

Extending upwardly from the upper surface of each leaf is a pin 52 which is used for extending or retracting the leaves in a manner to be described subsequently.

Received in the pressure relief passageway 42 is a pressure relief member 54 which may be, as illustrated, in the form of a bolt having a head 56 at the lower end and an enlarged diameter portion 58 threaded on the upper end. The portion 58 is receivable in the increased internal diameter recess 46 formed in the cylindrical body when the pressure relief member is in the downward position as shown in FIG. 3. The spring 60 is compressibly positioned between the ledge 44 and the enlarged diameter portion 58 to constantly urge the pressure relief member 54 in the upward direction.

Figure 6:
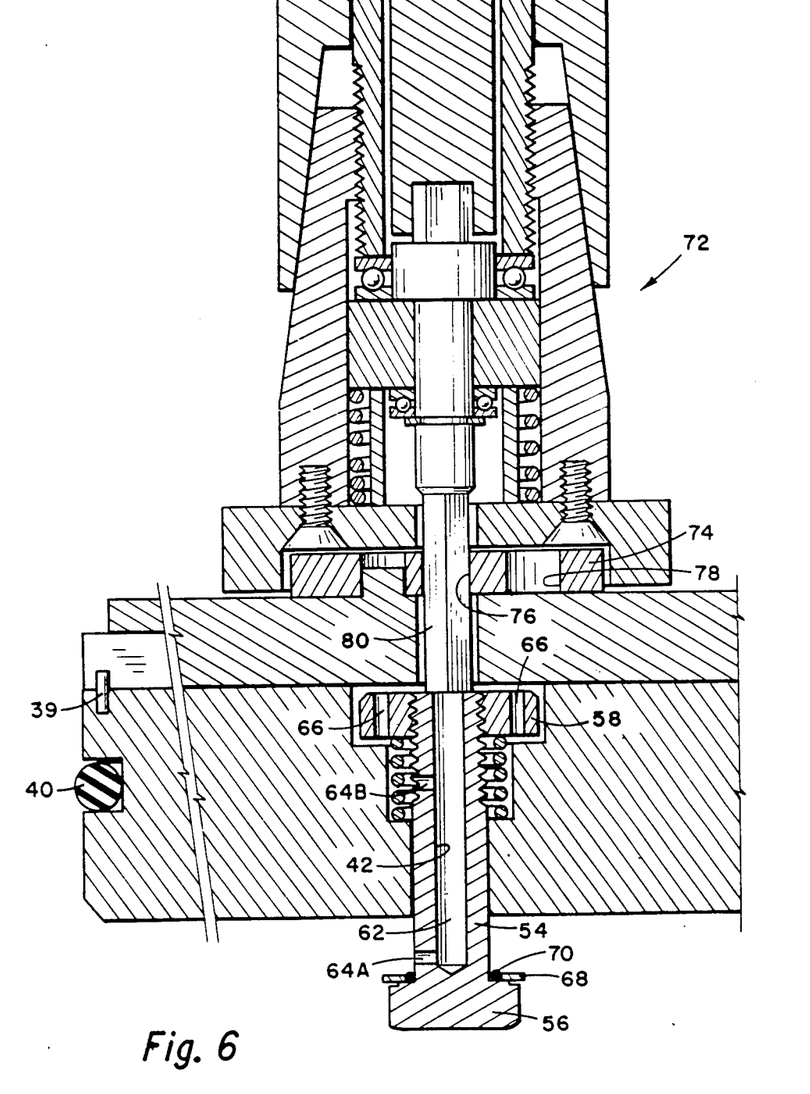
FIG. 6 is a partial elevational view, enlarged, showing the closure member in the unlocked position and with a mechanism utilized for inserting or removing the closure member.

Fluid bypass openings are provided in the pressure relief member, best shown in FIG. 6. The central opening 62 extends from the upper end of the member to adjacent the head portion 56. Lateral openings 64A and 64B communicate with the central opening 62. Further, the enlarged diameter head portion 58 has openings 66. Positioned on the pressure relief member 54 is a washer 68 having an integral elastomeric seal 70. When the pressure relief member 54 is in the upward position the pressure relief passageway 42 is closed, but when the pressure relief member is in the downward position, as shown in FIGS. 3 and 6, fluid can freely flow through the passageway 42, thereby permitting pressure to be equalized to either side of the closure member.

Figure 7:
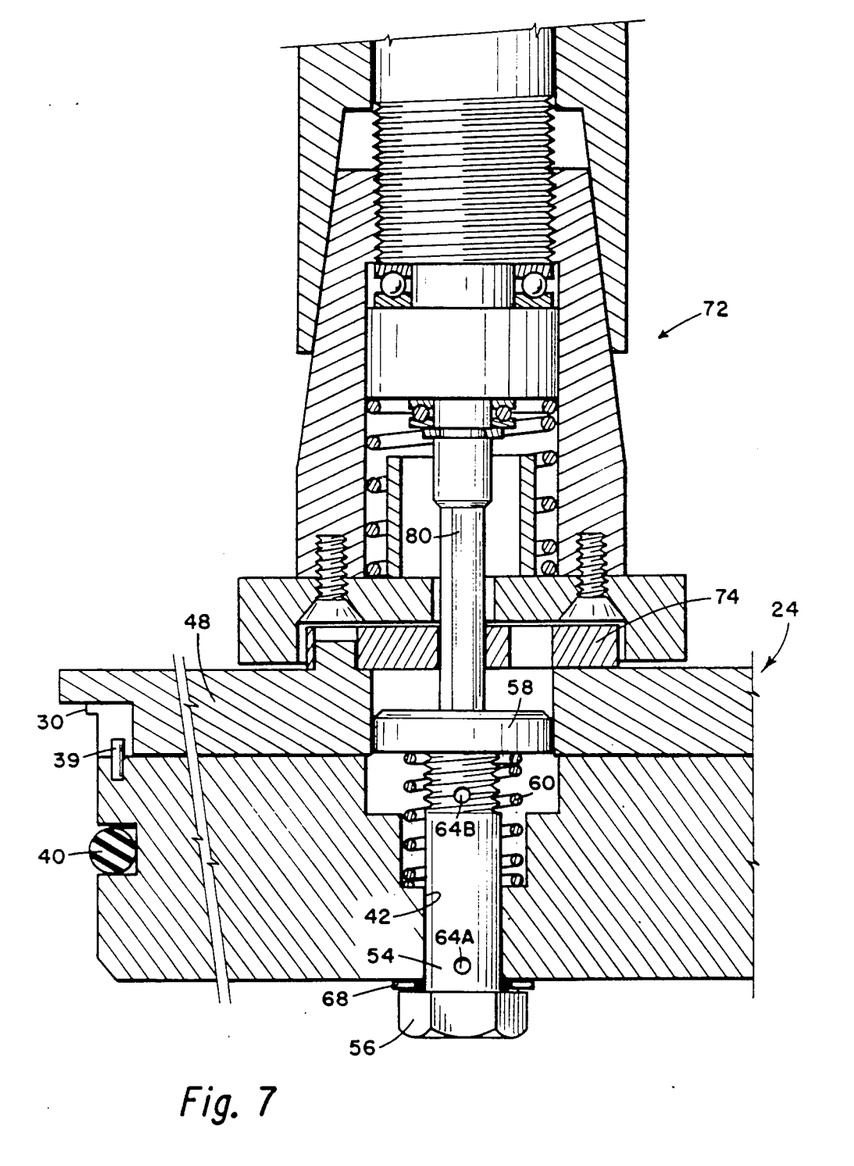
FIG. 7 is an elevational view as in FIG. 6 but showing the closure member in the locked position.
Figure 8:
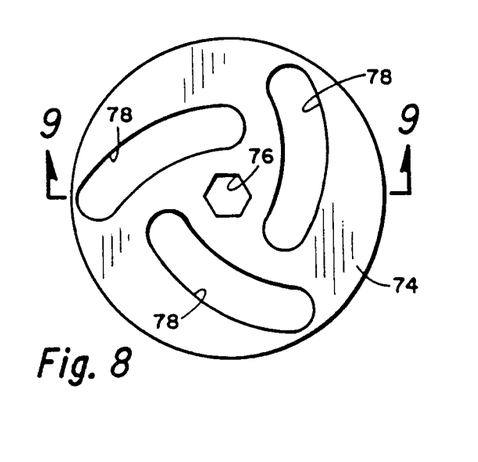
FIG. 8 is a top plan view of a cam plate as used to move the leaves of the closure member from the locked to the unlocked position and vice versa.
Figure 9:
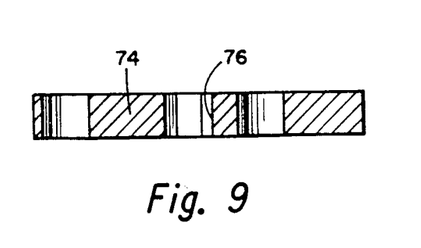
FIG. 9 is a cross-sectional view taken along the line 9—9 of FIG. 8.

FIGS. 6 and 7, along with FIG. 1, show a means of inserting and removing the closure member from the interior of a flange. The attachment mechanism is generally indicated by numeral 72 and is of a type commonly employed in industry and not a direct part of the invention and therefore will not be described in detail except for a flange plate 74 illustrated in FIGS. 8 and 9. The flange plate has a central hexagonal opening 76 and curved slots 78, there being one slot for each of the leaves 48. the slots 78 are dimensioned to receive the ends 52 extending upwardly from the leaves. When the came plate 74 is positioned in engagement with the closure members so that ends 52 are received within slot 78, the rotation of the cam plate serves tomove the leaves radially inwardly and outwardly.

The attachment mechanism 72 includes a downwardly extending plunger, the lower end 80 of which is hexagonal and is slidably received in the hexagonal opening 76 in the flange plate.

To install a closure member 24 within flange 12, referring to FIG. 1, the valve 18 is open as shown. the closure member 24 is lowered by tool 16 to the interior of flange 12. The closure member seats properly within the interior of the flange when lip 30 rests against ledge 32 as shown in FIG. 5. To secure the closure member within the flange, the plunger is rotated, the lower end 80 of which rotates the cam plate 74 to radially outwardly extend leaves 48. As the outer end 48A of the leaves extends within groove 34 within the flange, it can be seen that the flange is securely locked in position. Further, it can be seen that the seal 40 closes flange passageway 22. It should still further be observed that when the closure member is inserted with the leaves withdrawn, the pressure relief member 54 must be downwardly depressed to the position shown in FIGS. 2 and 3 thereby permitting fluid to flow through the pressure relief member to equalize pressure on each side of the closure member. After the leaves have been outwardly extended and the plunger 80 upwardly withdrawn, spring 60 move the pressure relief member to the upper position as shown in FIGS. 5 and 7. This serves two functions. First, it closes fluid flow through the reduced diameter passageway 42. Second, the enlarged upper end portion 58 of the pressure relief member prohibits the leaves 48 from being inwardly withdrawn, that is, moved out of engagement with the flange groove 34. The passageway through the flange is now completely sealed and the closure member is locked in position. This will enable the operator to completely remove the tapping machine 16 and the valve 18 if desired and a blind flange could then be bolted on the flange.

Later, if it is desired to again provide entry into the interior of the pipeline 10, the operator can remove the blind flange (not shown) if it is affixed to flange 12. Thereafter, the valve 18 and the tapping machine mechanism 16 is attached. To remove the closure member 24, the operating mechanism isfirst lowered and before effort can be made to remove the closure member, the plunger 80 must be downwardly positioned. This moves the pressure release member 54 downwardly to provide fluid communication through the passageways in the pressure relief member so that pressure can be quickly equalized to either side of the closure member. Thereafter, as a separate and distinctive step, the plunger is rotated, rotating the cam plate to retract the leaves. Note that the leaves can not be retracted until the pressure relief member is first downwardly positioned to insure that pressure is equalized to either side of the closure member. This action which requires two separate and distinct actions of the operator insures that the closure member can not be released from engagement within the interior of the flange without first the operator intentionally taking the step necessary to relieve the pressure across the closure member.

The invention is shown utilizing three leaves 48 although obviously four or mroe may be employed. While only two leaves may be used, a preferred arrangement contemplates at least three such leaves.

Figure 10:
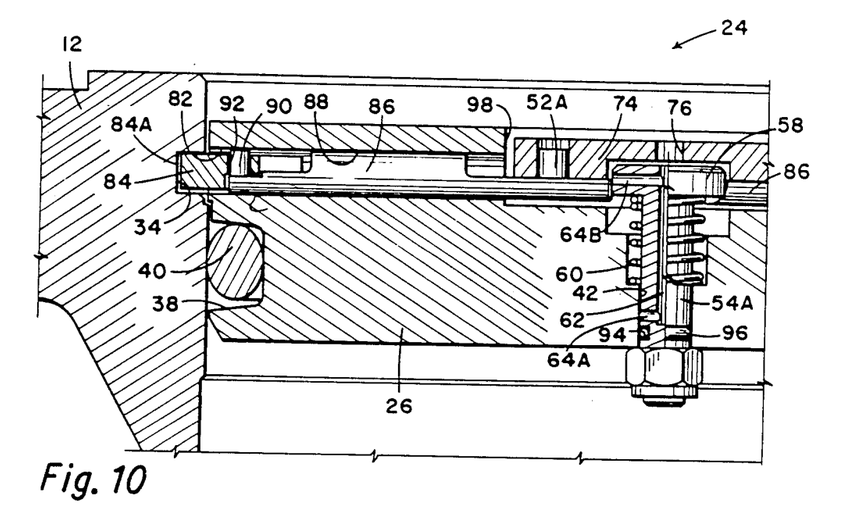
FIG. 10 is a cross-sectional view as in FIG. 5 showing an alternate embodiment of the invention in which each leaf member is made up of a crescent shaped segment portion and a linkage member.
Figure 11:
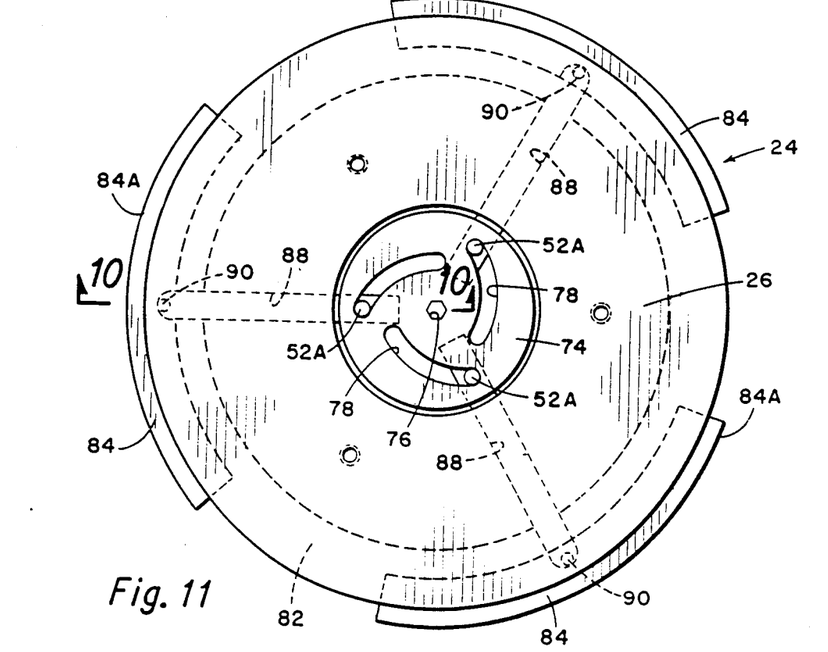
FIG. 11 is a top view of the alternate embodiment of the closure member shown in FIG. 10.

FIGS. 10 and 11 shown an alternate embodiment of the invention in which the closure member 24 has a circumferential groove 82 therein and wherein each of the leaves is formed to two basic portions, that in a crescent shaped segment portion 84 and a linkage member 86. Each linkage member is received in a radially extending opening 88.

In the illustrated arrangement each of the radial openings 88 is cylindrical in cross-section and each of the linkage members 86 is likewise of generally cylindrical cross-sectional configuration and is slideable within the openings 88.

Each of the segment portions 84 has an outr frustocircular edge 84A which is of about the diameter of the outer cylindrical surface of the internal circumferential groove 34 in flange 12 and the segment portions 84 are inwardly and outwardly slideable within the circumferential groove 82. The outer end of each of the linkage members 86 is affixed to a segment portion 84 such as by means of a pin 90 which is received in an opening 92 in each of the segments.

Affixed to each of the linkage members 86 adjacent the inner end thereof is an upstanding pin 52A which has the same purpose as pin 52 of the leaves previously described; that is, the pins 52A are received in slots 78 of a cam plate 74. When the cam plate is rotated in one direction the linkage members 86 are moved inwardly, thereby moving the segments 84 inwardly and when the cam plate is rotated in the opposite direction the linkage member and therefore the segments are pushed outwardly. In the outward direction, as illustrated in FIGS. 10 and 11, the segments extend within the internal groove 34 of flange 12. It can be seen that the embodiment of Figure 10 and 11 functions essentially the same as that of the first described embodiment except that the leaves are arranged differently.

The pressure relief member 54A of FIG. 10 functions in the same manner as that of the pressure relief member previously described with a slight exception in the method of sealing. A circumferential groove 94 is formed in the pressure relief member 54A adjacent the bottom thereof and receives an O-ring 96. In the upward, closed position, the O-ring is received within the pressure relief passageway 42 to close fluid flow through it. In addition, in this upward position the enlarged diameter portion 58 prevents the linkage members 86 from being moved inwardly, thereby preventing the lcosure member 24 from being inadvertently removed from the flange until the pressure relief member 54A has been downwardly displaced. The passageways 62, 64A and 64B provide a channel so that when the pressure relief member is downwardly displaced communication is provided to relieve pressure differential whichmay exist across the closure member. This assures that the closure member of FIGS. 10 and 11 is provided with the safety feature the same as that described for the first embodiment. In FIGS. 10 and 11 a circular recess 98 is formed in the top surface of the plug member body 26 which receives the cam plate 74 but otherwise the operation of the cam plate remains the same.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A closure member for use in a flange having a passageway therethrough communicating with a pressure source, the flange having aninternal circumferential groove, the closure member comprising:

a cylindrical body of external diameter to be slideably received within the flange passageway, the body having a reduced diameter passageway therethrough;

a plurality of leaves slideably supported to said body, each leaf having an outer and an inner end, each leaf being slideable between an outward and an inward position, the outer ends being receivable in said flange groove when the leaves are slideably outwardly extended to the outer position to retain said body in the flange passageway;

means to seal the outer periphery of said body to the flange passageway;

a pressure relief member slideably received in said body passageway having an open and a closed position;

means to prevent said leaves from being moved inwardly when said pressure relief member is in the closed position; and means to move said leaves from the outward to the inward positions and vice versa.

2. A closure member according to claim 1 wherein said pressure relief member includes a head portin which is received between said leaves inner ends when said leaves are outwardly extended to thereby prevent said leaves from being slideably displaced to said inward position.

3. A closure member according to claim 1 wherein said pressure relief member is formed of a cylindrical body portion slideably received in said body reduced diameter passageway and having an enlarged portion on the upper and lower end and being slideable between an upward closed position and a downward release position;

a spring received within said reduced diameter passageway upwardly biasing said pressure relief member;

means to close said reduced diameter passageway against fluid flow when said pressure relief member is in said upward closed position; and said pressure relief member enlarged upper end portion being dimensioned to be received between opposed leaves inward ends when said leaves are in said outward positions and when said pressure relief member is in said upward closed position to thereby prevent said leaves from being moved to said inward position.

4. A closure member according to claim 3 wherein said pressure relief member has an internal passageway which communicates from below to above said cylindrical body when said pressure relief member is in said downward release position; and means to close said pressure release member internal passageway when said pressure relief member is in said upward closed position.

5. A closure member according to claim 1 wherein said cylindrical body has a radially extending inverted T-shaped slot therein for each of said leaves and wherein said leaves each has a longitudinal T-shaped portion extending therefrom in the direction between said leaves inner and outer ends, the T-shaped portions being slideably received in said T-shaped slots.

6. A closure member according to claim 1 wherein each of said leaves has an upstanding pin and wherein said means to move said leaves from the outward to the inward position and vice versa includes:

a cam plate rotatable about an axis concentric with said cylindrical body cylindrical axis, the cam plate having a curved slot therein for each of said leaves, each slot being dimensioned to receive a said upstanding pin from one of said leaves, said slots being configured so that upon rotation of said cam plate in one direction said pins and thereby said leaves are outwardly displaced and upon rotation of said cam plate in the other direction said pins and thereby said leaves are inwardly displaced.

7. A closure member according to claim 1 wherein said cylindrical body has a circumferential groove therein and wherein said means to seal the outer periphery of said body to said flange passageway includes an elastomeric member received in the circumferential groove.

8. A closure member according to claim 1 wherein said cylindrical body has a plurality of spaced apart, radially extending openings therein in a plane perpendicular the body cylindrical axis, and having a circumferential groove in the cylindrical sidewall thereof, the groove communicating with said radially extending openings, and wherein each of said leaves comprises:

a crescent-shaped segment portion having an outer frusto-circular edge of diameter substantially that of the flange intrnal circumferential groove, the segment portions being slideably received in said circumferential groove in the cylindrical sidewall of said cylindrical body; and a linkage member having an inner and an outer end and being slideably received in each of said radially extending openings in said body, the outer end of each being affixed to a said segment portion, said segment portions being receivable in said flange groove when the leaves are slideably, outwardly extended.

9. A closure member according to claim 8 wherein each of said linkage members has an upstanding pin adjacent said inner end and wherein said means to move said leaves formed of said segment portions and said linkage members from the outward to the inward position and vice versa includes:

a cam plate rotatable about an axis concentric with said cylindrical body cylindrical axis, the cam plate having a curved slot therein for each of said leaves, each slot being dimensioned to receive a said upstanding pin from one of said leaves, said slots being configured so that upon rotation of said cam plate in one direction said pins and thereby said leaves are outwardly displaced and upon rotation of said cam plate in the other direction said pins and thereby said leaves are inwardly displaced.

* * * * *